(12) United States Patent
Jourdan

(10) Patent No.: US 8,708,012 B2
(45) Date of Patent: Apr. 29, 2014

(54) ANTI-SKID DEVICE FOR A TIRE OF A VEHICLE WHEEL

(75) Inventor: Xavier Pierre Jourdan, Le Cheylas (FR)

(73) Assignee: Polaire, Le Cheylas (FR)

( * ) Notice: Subject to any disclaimer, the term of this patent is extended or adjusted under 35 U.S.C. 154(b) by 321 days.

(21) Appl. No.: 13/201,087

(22) PCT Filed: Feb. 10, 2010

(86) PCT No.: PCT/FR2010/000104
§ 371 (c)(1),
(2), (4) Date: Aug. 11, 2011

(87) PCT Pub. No.: WO2010/092250
PCT Pub. Date: Aug. 19, 2010

(65) Prior Publication Data
US 2011/0308682 A1    Dec. 22, 2011

(30) Foreign Application Priority Data

Feb. 13, 2009 (FR) ..................................... 09 00675

(51) Int. Cl.
*B60C 27/12* (2006.01)
(52) U.S. Cl.
USPC ......... 152/216; 152/218; 152/221; 152/225 R
(58) Field of Classification Search
USPC ............. 152/167, 170, 171, 172, 173, 213 R, 152/216, 217, 218, 221, 223, 224, 225 R
See application file for complete search history.

(56) References Cited

U.S. PATENT DOCUMENTS

| 2,271,275 | A | * | 1/1942 | Ritscher | 152/228 |
|---|---|---|---|---|---|
| 2,540,230 | A | * | 2/1951 | Andrews | 152/218 |
| 4,155,389 | A | * | 5/1979 | Dwinell | 152/221 |
| 4,304,280 | A | * | 12/1981 | Lew | 152/221 |
| 4,749,015 | A | * | 6/1988 | Miyagawa | 152/213 A |
| 6,619,353 | B1 | * | 9/2003 | Kim | 152/225 R |
| 7,036,542 | B2 | * | 5/2006 | Kaiser et al. | 152/218 |
| 7,703,492 | B2 | * | 4/2010 | Langue et al. | 152/218 |
| 8,162,016 | B1 | * | 4/2012 | Le | 152/217 |
| 8,453,690 | B2 | * | 6/2013 | Moore | 152/218 |
| 2002/0017350 | A1 | * | 2/2002 | Airoldi et al. | 152/213 R |

FOREIGN PATENT DOCUMENTS

| CH | 677215 A5 | 4/1991 |
|---|---|---|
| EP | 1 221 386 A1 | 7/2002 |
| EP | 1 752 320 A1 | 2/2007 |

OTHER PUBLICATIONS

International Search Report mailed Jun. 4, 2010 issued in International Patent Application No. PCT/FR2010/000104 (with translation).

* cited by examiner

*Primary Examiner* — Kip T Kotter
(74) *Attorney, Agent, or Firm* — Oliff PLC

(57) ABSTRACT

An anti-skid device for a tire of a vehicle wheel includes an anti-skid raceway designed to be placed on the circumferential tread of the tire. An elongate element extends in sliding manner through rear attachment means arranged along the periphery of the rear edge of the raceway. Means for tightening the raceway include at least one guide member passing through the raceway to let a part of the elongate element slide freely transversely to the raceway, in front of the front edge of the raceway, elastically extensible means arranged along the elongate element, and securing means to connect at least one end of the elongate element to the front element.

7 Claims, 5 Drawing Sheets

ANTI-SKID DEVICE FOR A TIRE OF A VEHICLE WHEEL

BACKGROUND OF THE INVENTION

The invention relates to an anti-skid device for a tyre of a vehicle wheel comprising:
- an anti-skid raceway designed to be placed on the circumferential tread of the tyre,
- means for securing the raceway on the circumferential tread of the tyre,
- front attachment means arranged on the periphery of the front edge of the raceway,
- a front element connected to the front attachment means and forming a stop against the front wall of the tyre after the securing means have been actuated,
- rear attachment means arranged on the periphery of the rear edge of the raceway,
- and an elongate element connected to the rear attachment means and forming a stop against the rear wall or the circumferential tread of the tyre after the securing means have been actuated.

STATE OF THE ART

Accessibility of the volumes located to the rear of the wheels on present-day vehicles is increasingly difficult. It is for this reason that certain attachment means are designed to be actuated from the front of the wheel and that operations on the rear of the wheel (for example closing the elongate element) are avoided.

Such an anti-skid device for a tyre is for example described in the document CH677215 in which the rear elongate element is connected to the rear edge of the raceway by rear attachment means formed by small chains. The securing means of the raceway are formed by means exerting centripetal forces on the front element formed by a chain forming a loop. This results in the front attachment means being radially forced towards the inside of the wheel, applying transverse tractive forces on the raceway towards the front of the wheel. By making the elongate element come up against the rear stop formed by the rear wall of the tyre, the rear attachment means, i.e. the chains, are forced radially towards the outside of the wheel to exert centrifugal forces towards the outside of the wheel on the elongate element. The elongate element, which is arc-shaped, therefore does not participate in the securing function, this result being obtained solely by the centripetal forces applied to the front attachment means, at the front of the wheel. This is why fixing of the anti-skid device remains perfectible, with all the risks and inconveniences that this implies.

The document EP-A1-1752320 discloses a device that is remarkable in that the elongate element extends in sliding manner through the rear attachment means and that the securing means comprise:
- at least one guide member passing through the raceway to let a part of the elongate element slide freely transversely to the raceway, to the front of the front edge of the raceway,
- elastically extensible means arranged along the elongate element,
- and securing means to connect at least one end of the elongate element to the front element.

It is necessary to fit the anti-skid device on the top part of the tyre, to perform a rotation of the wheel, and to then fit the remaining part before securing the elongate element to the front element. Fitting remains long and tiresome, and securing is perfectible.

OBJECT OF THE INVENTION

The object of the invention consists in improving fitting and securing of existing anti-skid devices.

This object is achieved by a device according to the appended claims, and more particularly by the fact that the raceway comprises flexible blocks distributed along a chain track forming a loop in such a way that the raceway presents a continuous shape and the flexible blocks are spaced out along the chain track, and that each flexible block comprises a flexible extension directed towards the rear edge of the raceway to form the rear attachment means.

BRIEF DESCRIPTION OF THE DRAWINGS

Other advantages and features will become more clearly apparent from the following description of a particular embodiment of the invention given for non-restrictive example purposes only and represented in the appended drawings, in which.

DESCRIPTION OF A PREFERRED EMBODIMENT OF THE INVENTION

Figure 1:
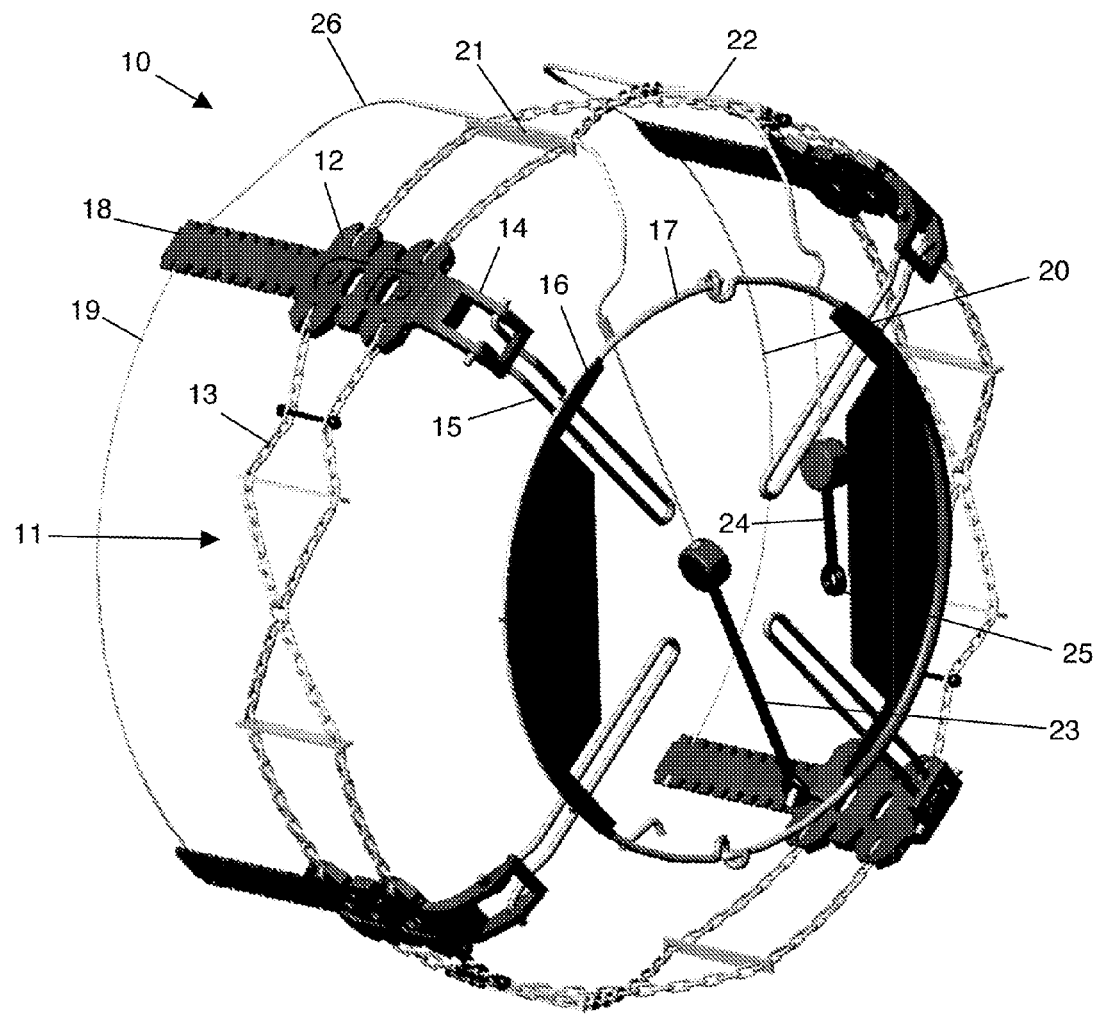
FIGS. 1 and 2 represent front and rear perspective views of an anti-skid device according to the invention.
Figure 2:
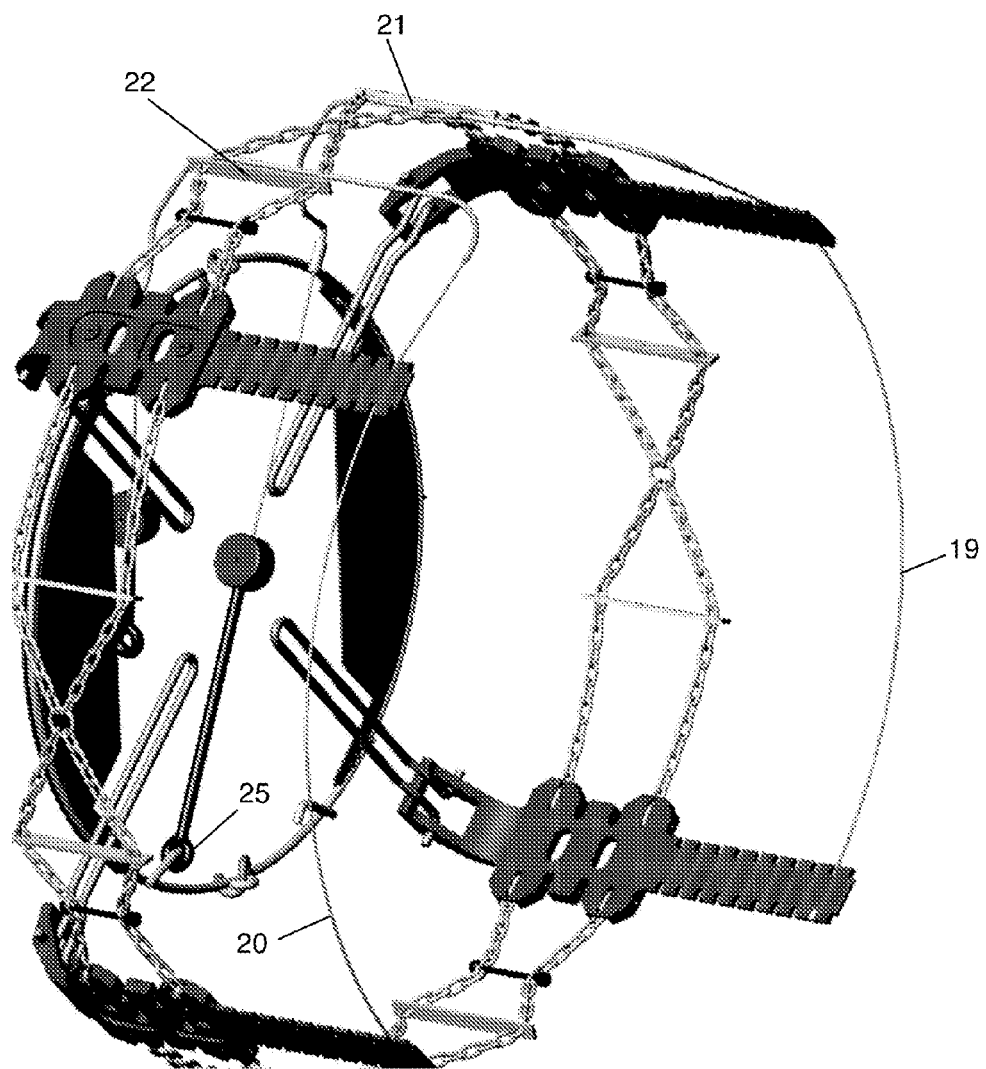
Figure 3:
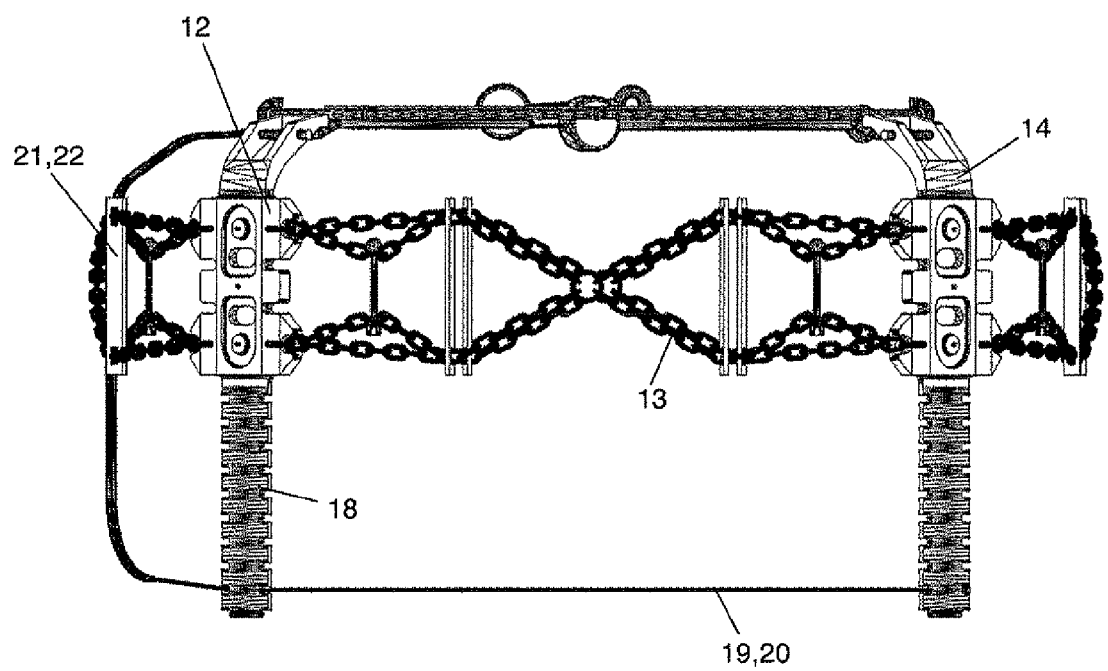
FIG. 3 is a top view of the device of FIGS. 1 and 2, FIGS. 4 and 5 are side views of the device of FIGS. 1 to 3 in situation on a vehicle wheel, respectively before and after actuation of the securing means.

In FIGS. 1 to 5, an anti-skid device 10 for a tyre of a vehicle wheel comprises a continuous anti-skid raceway 11 designed to be placed on the circumferential tread of the tyre. Securing means (described further on) of raceway 11 on the circumferential tread of the tyre are provided to guarantee that anti-skid device 10 is kept in position after it has been fitted on the tyre.

When fitted on the tyre of the wheel, raceway 11 takes a substantially circular shape and defines a main axis which coincides with the axis of rotation of the wheel.

In the following part of the present application, the front direction and the rear direction respectively correspond to the directions facing towards the outside and towards the inside of the vehicle according to its main axis. The front edge of raceway 11 corresponds to the edge of raceway 11 contained in a plane perpendicular to the main axis and directed towards the outside of the vehicle. A similar definition of the rear edge of raceway 11 applies towards the inside of the vehicle. The rear and front walls of the tyre designate the walls respectively facing the inside and the outside of the vehicle. The rear and front walls of the tyre are joined to one another by the circumferential tread of the tyre.

Raceway 11 comprises flexible blocks 12 distributed along a chain track 13 forming a loop. Raceway 11 therefore presents a continuous shape and flexible blocks 12 are spaced out along chain track 13 to perform guiding of the chains of chain track 13. The shape and length of the chain track depend on the use and on the type of vehicle to be equipped. Flexible blocks 12 and the chains of chain track 13 are mechanically connected, in secured manner by any suitable means or in sliding manner. The number of flexible blocks 12 is variable, for example comprised between two and six. Chain track 13 can incorporate adjustment elements which can be automatic.

Front attachment means are spaced out along the periphery of the front edge of raceway 11. For this, each flexible block 12 can comprise a tongue 14 directed towards the front of the front edge of raceway 13. Each tongue 14 is curved so as to be naturally facing in the direction of the center of the wheel when anti-skid device 10 is fitted on the tire of the wheel. A hook 15 is articulated on each tongue 14 and is extended towards the center of the wheel.

On the inside, rear attachment means are distributed along the periphery of the rear edge of raceway 11. To form the rear attachment means, each flexible block 12 comprises a flexible extension 18 directed towards the rear of the rear edge of raceway 11. At least one elongate element is connected to the rear attachment means, more precisely to the end of each of extensions 18, opposite the one connected to the body of block 12.

Each elongate element can border a complete or partial angular sector of the rear edge of the raceway. In the case of several elongate elements, they can advantageously border distinct angular sectors. Each elongate element can extend with sliding through the rear attachment means or be connected to the latter in fixed manner. For this, means for supporting the elongate element with free sliding can be arranged at the free end of each flexible extension 18. Each of the elongate elements can be flexible or not.

A front element 17 is joined by any suitable means (welding, bolting) to the different hooks 15 so that front element 17 is connected to the front attachment means. The front attachment means are formed by the combination of tongues 14, hooks 15 and any connecting elements that may be present between front element 17 and hooks 15. At least one hook 15 is thus securely affixed to front element 17. Front element 17 can for example be a flexible bow formed by two semicircular arcs connected to one another via their ends. Two ends in correspondence can then be joined by means of an articulation, so that front element 17 can be folded in the manner of a hinge. However, the front element can be of any shape, for example in the shape of a cross formed by two bars joined via their center. The function of the front element is to impose a maximum diameter on flexible blocks 12, corresponding to the dimension of the circumferential tread of the tyre.

In addition to at least one elongate element which may be connected in sliding manner to the rear attachment means, the securing means can optionally comprise at least one guide member 26 passing through raceway 11 to let a part of the elongate element slide freely transversely to raceway 11 so as to position itself in front of the front edge of raceway 11. The guide member can be securely fixed to the raceway or to front element 17 so as to form a stop point with respect to sliding of the elongate element. In an alternative embodiment enhancing the securing effect of raceway 11 on the circumferential tread, the elongate element is formed by two independent cables 19, 20 bordering two distinct angular sectors of the rear edge of raceway 11 and each following a respective passage 21, 22 of the guide member. The elongate element then comprises two distinct cable parts in front of the front edge of raceway 11.

The securing means also comprise elastically extensible means arranged along the elongate element at any location. In the particular case where the elongate element is formed by two independent cables, each of cables 19, 20 can comprise elastically extensible means 23, 24. In this case, elastically extensible means 23, 24 of each of cables 19, 20 can be arranged on the part of cable in front of the front edge of raceway 11.

To terminate the securing function, securing means can be provided to connect at least one end of the elongate element to front element 17. The securing means can for example collaborate with said at least one hook 15 securely affixed to front element 17, at the level of the free end of hook 15 opposite the end connected to the body of flexible block 12. The securing means can be formed by an attachment 25 fitted on the free end of the part of cable 19, 20 to the front of the front edge of raceway 11. The opposite end of each of cables 19, 20, to the rear of the rear edge of raceway 11, can be equipped with a stop block pressing against one of flexible extensions 18, to block sliding of the cables.

Once fitted on the wheel, anti-skid device 10 is kept in place after the securing means have been actuated. To actuate the securing means, it suffices to pull on the part of the elongate element to the front of the front edge of raceway 11 to tension the elastically extensible means before securing the end of the elongate element to front element 17. Front element 17 forms a stop against the front wall of the tyre after the securing means have been actuated. The elongate element forms a stop against the rear wall or the circumferential tread of the tyre after the securing means have been actuated. These front and rear stops prevent raceway 11 from translating along the main axis.

Figure 4:
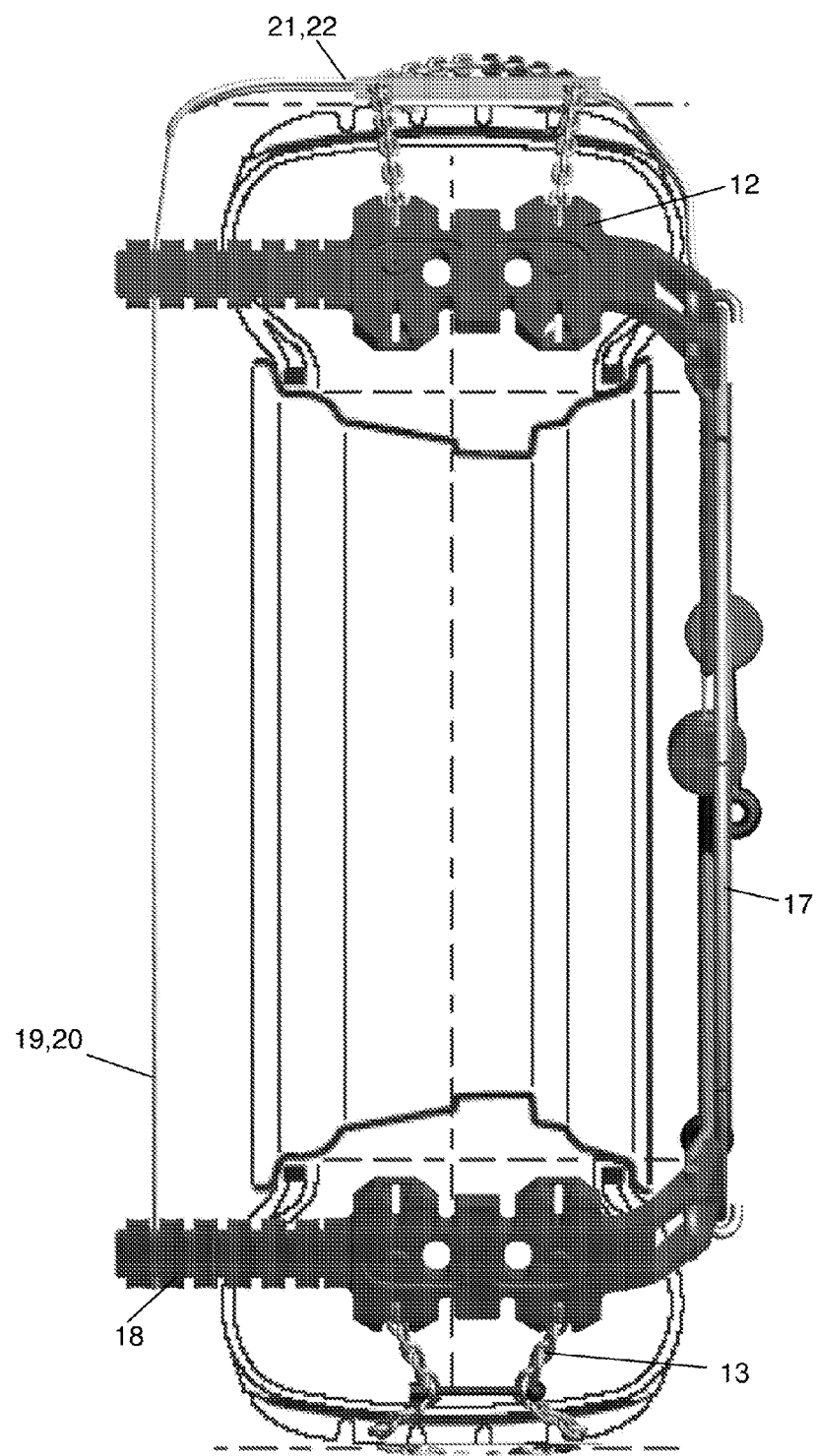

With reference to FIG. 4, anti-skid device 10 is positioned whereas the securing means are not connected to the front element. The rear attachment means are not subjected to any mechanical stress, and flexible extensions 18 are not curved radially in the direction of the main axis, enabling raceway 11 to be positioned around the circumferential tread of the tire at the top part of the tire. Passages 21, 22 are positioned on the top part of the circumferential tread. In this state, raceway 11 only partially covers the circumferential tread, its bottom part being inaccessible.

Figure 5:
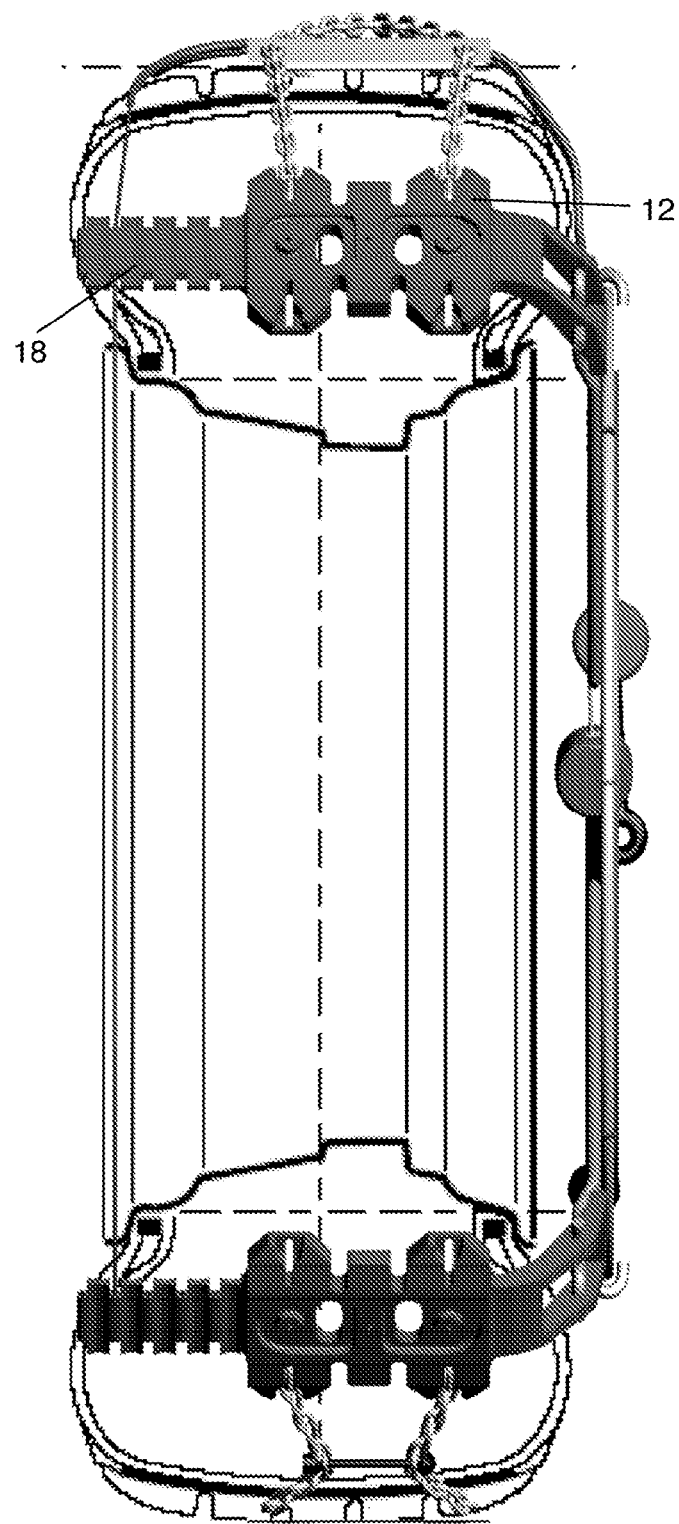

Cables 19, 20 are then pulled to tension by the elastically extensible means 23, 24 before securing attachments 25 to front element 17 by means of hooks 15. The flexible extensions fold radially inwards to come and press against the rear wall of the tire. Subsequent application of a rotation to the wheel suffices for the rest of raceway 11 to come and cover the rest of the circumferential tread of the tire without any other manual operation, due to the effect of the centrifugal forces combined with the inward radial forces applied to the flexible extensions (FIG. 5).

Unlike the prior art and due to the fact that the raceway is extended to the rear by flexible extension elements 18 which are able to exert a reaction force on the rear wall of the tyre, positioning and tensioning of anti-skid device 10 on the tyre of the vehicle wheel are therefore sufficient, when the vehicle is set in motion, to achieve complete fitting of the device, securing on the wheel and self-positioning, without the user performing any other operation.

The securing means are able to radially bias the rear attachment means towards the inside of the wheel. The elongate element extends from the rear of the wheel up to the front of raceway 11 so as to be able to be gripped by a user from the front of the wheel. After they have been attached, elastically extensible means 23, 24 perform mechanical tensioning of the elongate element. This results in a tractive force exerted on front element 17, which forces the front attachment means radially towards the inside of the wheel, participating in securing to raceway 11. By counter-reaction, elastically extensible means 23, 24 exert a tractive force on the elongate element, which forces the rear attachment means radially towards the inside of the wheel, thereby completing the effect of securing to raceway 11.

It is possible to envisage fitting where the elongate element is formed by a single cable or by different angular sections formed by flexible elements. Furthermore, each of the cables used can be replaced by a chain or by a flexible element.

The advantage of providing two independent systems each formed by a cable 19, 20 engaged with sliding in several flexible blocks 12 is that it increases safety: breaking of one of the systems does not result in the anti-skid device being lost.

Finally the invention remains applicable even in the case where the elongate element does not slide freely in a guide member passing through the raceway.

The invention claimed is:

1. An anti-skid device for a tire of a vehicle wheel, comprising:
    an anti-skid raceway designed to be placed on a circumferential tread of the tire,
    means for securing the raceway on the circumferential tread of the tire,
    front attachment means arranged on a periphery of a front edge of the raceway,
    a front element connected to the front attachment means and forming a stop against a front wall of the tire after the securing means has been actuated,
    rear attachment means arranged on a periphery of a rear edge of the raceway,
    and at least one elongate element connected to the rear attachment means and forming a stop against the rear wall or the circumferential tread of the tire after the securing means has been actuated,
    wherein the raceway comprises flexible blocks distributed along a chain track forming a loop so that the raceway presents a continuous shape and the flexible blocks are spaced out along the chain track, and each flexible block comprises a flexible extension directed towards a rear of the rear edge of the raceway to form the rear attachment means.

2. The device according to claim 1, wherein the elongate element extends in a sliding manner through the rear attachment means and the securing means comprises:
    at least one guide member passing through the raceway to let a part of the elongate element slide freely transversely to the raceway, to a front of the front edge of the raceway,
    elastically extensible means arranged along the elongate element,
    and securing means to connect at least one end of the elongate element to the front element.

3. The device according to claim 2, wherein the elongate element is formed by two independent cables bordering two distinct angular sectors of the rear edge of the raceway and each following a passage of the guide member, and each of the cables comprises the elastically extensible means.

4. The device according to claim 2, wherein the elastically extensible means of each of the cables is arranged on a part of the cable to the front of the front edge of the raceway.

5. The device according to claim 1, wherein the securing means collaborates with at least one hook securedly affixed to the front element.

6. The device according to claim 5, wherein each block comprises a flexible extension directed towards the rear of the rear edge of the raceway, and a free end of the flexible extension supports the elongate element with free sliding.

7. The device according to claim 1, wherein the raceway is continuous and comprises flexible blocks spaced out along a chain track.

\* \* \* \* \*